United States Patent
Wu et al.

(10) Patent No.: US 10,103,790 B2
(45) Date of Patent: Oct. 16, 2018

(54) COOPERATIVE TRANSMISSION SYSTEM AND COOPERATIVE TRANSMISSION METHOD FOR MULTIPLE ACCESS POINTS IN A WIRELESS LOCAL AREA

(71) Applicant: National Chiao Tung University, Hsinchu (TW)

(72) Inventors: Sau-Hsuan Wu, Hsinchu (TW); Hsi-Lu Chao, Hsinchu (TW); Chun-Kai Tseng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 122 days.

(21) Appl. No.: 15/223,986

(22) Filed: Jul. 29, 2016

(65) Prior Publication Data

US 2017/0163315 A1    Jun. 8, 2017

(30) Foreign Application Priority Data

Dec. 7, 2015  (TW) .............................. 104140923 A

(51) Int. Cl.
*H04L 12/26* (2006.01)
*H04B 7/024* (2017.01)
(Continued)

(52) U.S. Cl.
CPC ........... *H04B 7/024* (2013.01); *H04B 7/0452* (2013.01); *H04B 7/0456* (2013.01);
(Continued)

(58) Field of Classification Search
CPC .... H04B 7/024; H04B 7/0452; H04B 7/0617; H04B 7/0456; H04L 5/0048; H04L 5/0053; H04L 5/0035
See application file for complete search history.

(56) References Cited

U.S. PATENT DOCUMENTS

2011/0294527 A1\* 12/2011 Brueck ................. H04W 24/02
                                                                            455/466
2012/0106442 A1\*  5/2012 Xiao .................... H04W 72/044
                                                                            370/328

(Continued)

*Primary Examiner* — Jamal Javaid
(74) *Attorney, Agent, or Firm* — Mintz Levin Cohn Ferris Glovsky and Pope, P.C.; Peter F. Corless; Steven M. Jensen

(57) ABSTRACT

A cooperative transmission system and a cooperative transmission method used in multiple access points in a wireless local network are provided. The cooperative transmission system includes a plurality of access points, a clustering controller and at least one cluster controller. Each of the access points serves at least one user device within a serving range of the access point. The clustering controller clusters the access points into a plurality of clusters according to locations of the access points and the serving range. The at least one cluster controller controls cooperative synchronous downlink transmissions among all the access points within a cluster governed by the cluster controller, and the clusters, when intersecting with one another, employ an interference suppression mechanism to eliminate interference generated by the user devices or neighboring access points located in different clusters. Through the use of the cooperative communication technique and the interference suppression mechanism, the interference generated by a plurality of access points in a wireless local network due to overlapped basic service sets is avoided.

10 Claims, 12 Drawing Sheets

(51) Int. Cl.
  *H04B 7/0452* (2017.01)
  *H04B 7/0456* (2017.01)
  *H04B 7/06* (2006.01)
  *H04B 15/00* (2006.01)
  *H04L 25/02* (2006.01)
  *H04W 4/08* (2009.01)
  *H04W 74/08* (2009.01)
  *H04W 84/12* (2009.01)

(52) U.S. Cl.
  CPC ........... *H04B 7/0617* (2013.01); *H04B 15/00* (2013.01); *H04L 25/0202* (2013.01); *H04L 43/12* (2013.01); *H04W 4/08* (2013.01); *H04W 74/0808* (2013.01); *H04W 84/12* (2013.01)

(56) References Cited

U.S. PATENT DOCUMENTS

2015/0229377 A1* 8/2015 Kuchi ................. H04B 7/0626 370/252
2015/0319657 A1* 11/2015 Fan ...................... H04W 36/08 370/332

* cited by examiner

COOPERATIVE TRANSMISSION SYSTEM AND COOPERATIVE TRANSMISSION METHOD FOR MULTIPLE ACCESS POINTS IN A WIRELESS LOCAL AREA

CROSS-REFERENCE TO RELATED APPLICATION

This application claims under 35 U.S.C. § 119(a) the benefit of Taiwanese Patent Application No. 104140923 filed Dec. 7, 2015, the entire contents of which are incorporated herein by reference.

BACKGROUND OF THE INVENTION

1. Field of the Invention

This invention relates to cooperative transmission mechanisms in wireless communication techniques, and, more particularly, to a cooperative transmission system and a cooperative transmission method used in multiple access points in a wireless local network.

2. Description of Related Art

Recently, as the wireless communication technique develops rapidly, it is more and more popular that access points (APs) are used to construct a Wi-Fi network, in which each AP forms a basic service set (BSS). In order for users to use wireless Internet services quickly and conveniently, a great amount of Wi-Fi wireless APs are installed. The more the APs are installed, the distance between a user and the AP is shorter and thus the less the path loss of wireless signal energy becomes. As a result, the signal-to-noise ratio (SNR) of signals received by users within basic service sets constructed by the wireless APs is increased, and more people can use the services at the same time. However, too dense deployment of the wireless APs forms overlapped BSSs (OBSS), which results in bandwidth contention and channel interference among the APs. As a result, the throughput performance of the wireless network system reduces. To address the issue, IEEE 802.11ac standard regulates a new multi-user multiple input multiple output (MU-MIMO) transmission technique, which, however, is limited to be applied to a single BSS, and thus cannot solve the problem generated by the OBSSs.

Therefore, a cooperative transmission mechanism for a plurality of APs in a dense Wi-Fi wireless network to solve the problems of channel contention and interference among a plurality of adjacent APs and spectrum resource contention and signal interference among APs in OBSSs is one of the most urgent issues in the art.

SUMMARY OF THE INVENTION

In view of the problems in the prior art, it is an objective of the present invention to provide a cooperative transmission mechanism among multiple APs, which employs two cooperative communication techniques in an environment consisting of a plurality of APs, in order to solve the problems of severe channel contention and signal interference of downlink transmissions generated by overlapped basic service sets.

It is another objective of the present invention to solve the interference problem of overlapped basic service sets. A plurality of methods are provided to collect user channel information, in order to provide the application of access points that collect the user channel information in different device architectures.

In order to achieve the aforesaid objectives and other objectives, the present invention provides a cooperative transmission system used in multiple access points in a wireless local network, comprising: a plurality of access points, each of which is configured to serve at least one user device within a serving range of the access point; a clustering controller configured to cluster the access points into a plurality of clusters according to locations of the access points and the serving range; and at least one cluster controller configured to control cooperative synchronous downlink transmissions among all access points in a cluster governed by the at least one cluster controller, wherein the at least one cluster controller employs a cooperative multi-antenna multi-user technique to execute synchronous downlink data transmissions of the user devices in the clusters through selection of the user devices, execution of a probing process, collection of the user channel information and calculation of a pre-coding matrix, wherein at least two of the clusters, when intersecting with each other, exchange channel information for employing an interference suppression mechanism to eliminate interference generated by the user devices that are located in different clusterintersecting areas.

In yet another embodiment, each of the access points determines an order of executing a channel measuring process by using a channel contention technique, so as to obtain the user channel information.

In another embodiment, the clusters execute a probing process sequentially, and the user devices located in the different cluster intersecting areas participate in the probing process of the clusters, so as to obtain the user channel information.

In yet another embodiment, the access points within the same cluster form a multicast group, such that each of the user devices performs channel estimation in one time and replies all channel information, so as to obtain the user channel information.

The present invention further provides a cooperative transmission method used in multiple access points in a wireless local network, comprising: clustering a plurality of access points into a plurality of clusters, wherein each of the access points serves at least one user device within a serving range of the access point; having each of the clusters execute synchronous downlink data transmissions of the user devices in each of the clusters through a cooperative multi-antenna multi-user technique; having the clusters exchange user channel information thereof, the user channel information including user channel information of the user devices that are located in different cluster intersecting areas; and having the clusters eliminate interference generated by the user devices or neighboring access points that are located in the different clusters through an interference suppression mechanism.

The present invention further provides a cooperative transmission system used in multiple access points in a wireless local network, comprising: a plurality of access points, each of which is configured to serve at least one user device within a serving range of the access point; a clustering controller configured to cluster the access points into a plurality of clusters according to locations of the access points and the serving range; and at least one cluster controller configured to control cooperative synchronous downlink transmissions among all access points in a cluster governed by the at least one cluster controller, wherein the at least one cluster controller employs a cooperative multi-antenna multi-user technique to execute synchronous downlink data transmissions of the user devices in the clusters through selection of the user devices, execution of a probing process, collection of user channel information and calculation of a pre-coding matrix, wherein at least two of the clusters, when intersecting with each other, exchange the user channel information for employing an interference suppression mechanism to eliminate interference generated by the neighboring access points that are located in different clusters.

Compared with the prior art, the cooperative transmission system and the cooperative transmission method used in multiple access points in a wireless local network according to the present invention employ a clustering controller to cluster the access points into a plurality of clusters in an integral central controlling architecture, in which each of the clusters has its own cluster controller. A cooperative multi-antenna multi-user technique is employed for the access points in an identical cluster, thereby exchanging user channel information and user transmission data and forming a virtual multi-user multi-input multi-output downlink transmission system. To address inter-cluster interference, the user channel information is exchanged, and an interference suppression mechanism is used to suppress the above interference circumstances. Therefore, the cooperative transmission system and the cooperative transmission method used in multiple access points in a wireless local network according to the present invention provide a cooperative transmission mechanism among multiple access points in a WiFi wireless local network, especially for those having overlapped basic service sets. As a result, the spectrum resource contention and signal interference among access points in the overlapped basic service sets are solved.

BRIEF DESCRIPTION OF DRAWINGS

The invention can be more fully understood by reading the following detailed descriptions of the preferred embodiments, with references made to the accompanying drawings, wherein.

DETAILED DESCRIPTION OF THE INVENTION

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
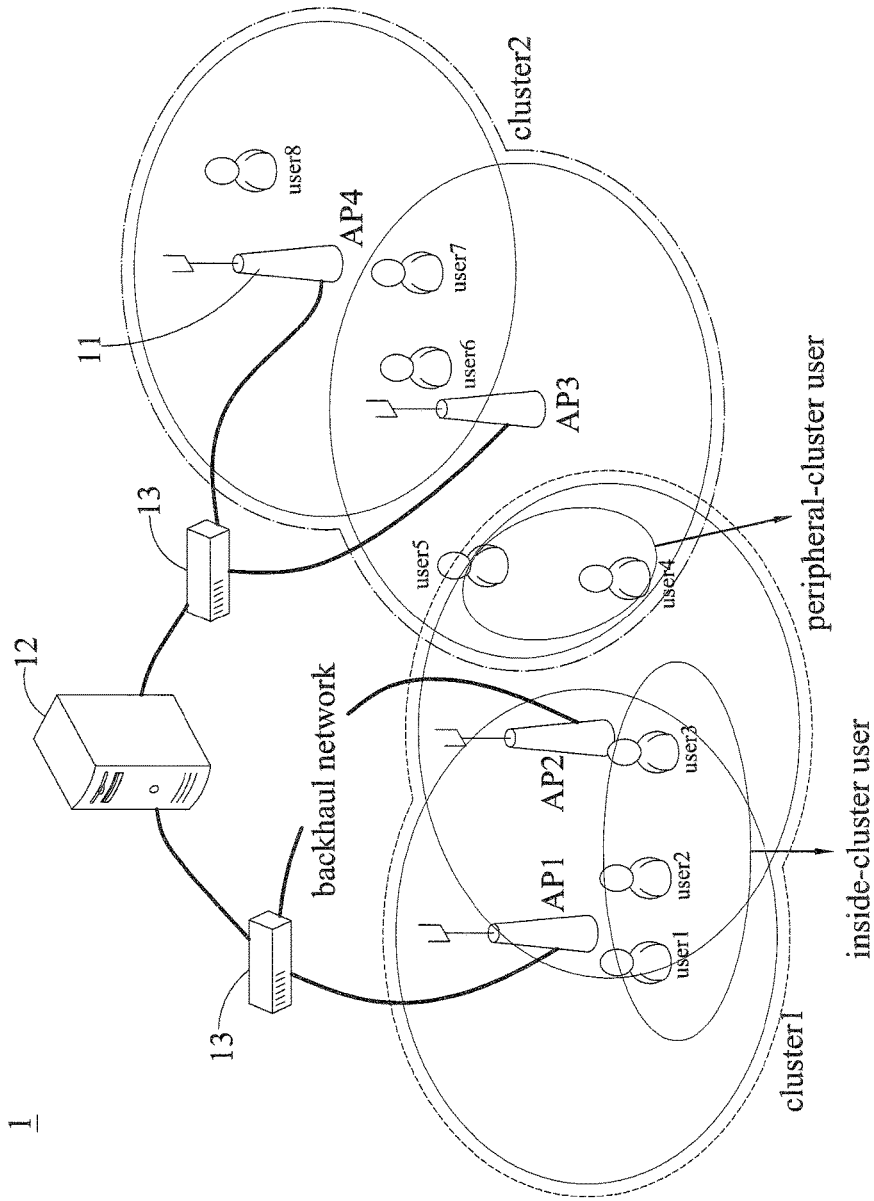
FIG. 1 is a system architecture diagram of a cooperative transmission system used in multiple access points in a wireless local network according to the present invention.

FIG. 1 illustrates a system architecture diagram of a cooperative transmission system used in multiple access points (APs) in a wireless local network according to the present invention. Each wireless APs constructs a basic service set (BSS). For APs AP1, AP2, AP3 and AP4 have their own respective service area and served users thereby. Each of the APs AP1-AP4 has two antennas. The access point AP1 may use the MU-MIMO technique to transmit data to a user device User1 and a user device User2. Similarly, the access points AP2, AP3 and AP4 use the MU-MIMO technique to transmit data to a user device User3 and a user device User4, a user device User5 and a user device User6, and a user device User7 and a user device User8, respectively. In the case that each of the user devices has only one antenna, under the IEEE 802.11ac standard each of the access points has its serving area that has a regulated MU-MIMO transmission mechanism. In the four access points AP1-AP4 in FIG. 1, it is a contention channel technique that is used to determine an order of executing a channel measuring process (i.e., a probing process).

Figure 2A:
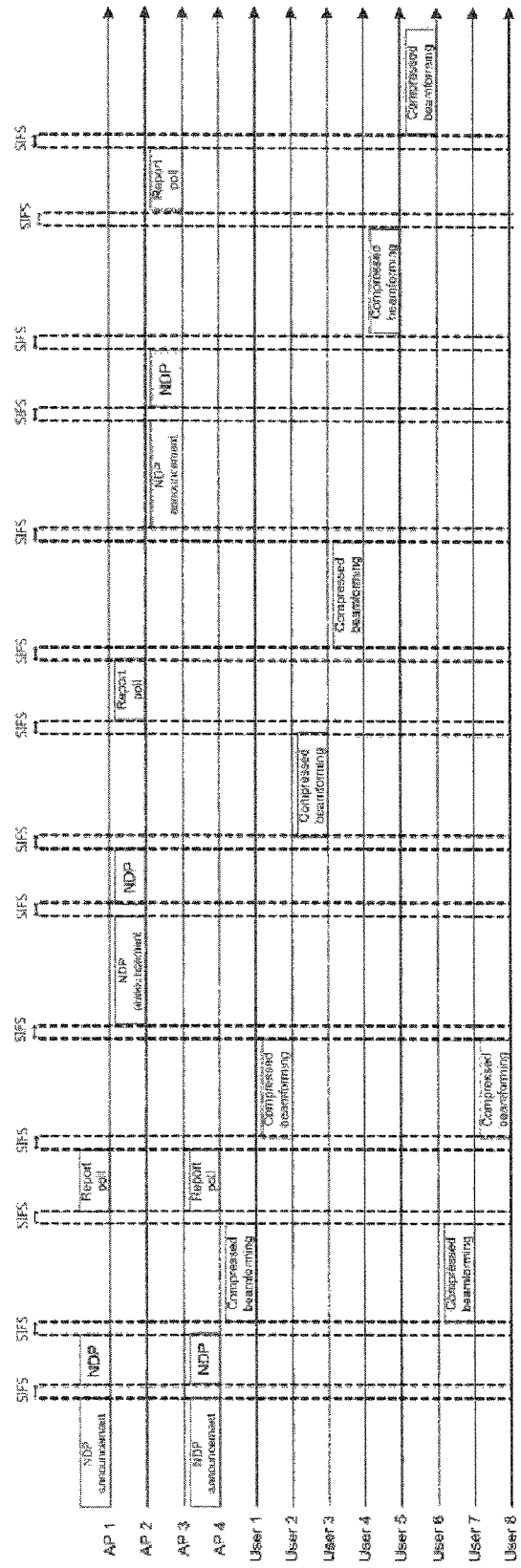
FIGS. 2A and 2B are a packet exchanging time diagram and a data transmission timing diagram in a probing process in which an IEEE 802.11ac multi-user multi-input multi-output technique is employed in FIG. 1 according to the present invention.
Figure 2B:
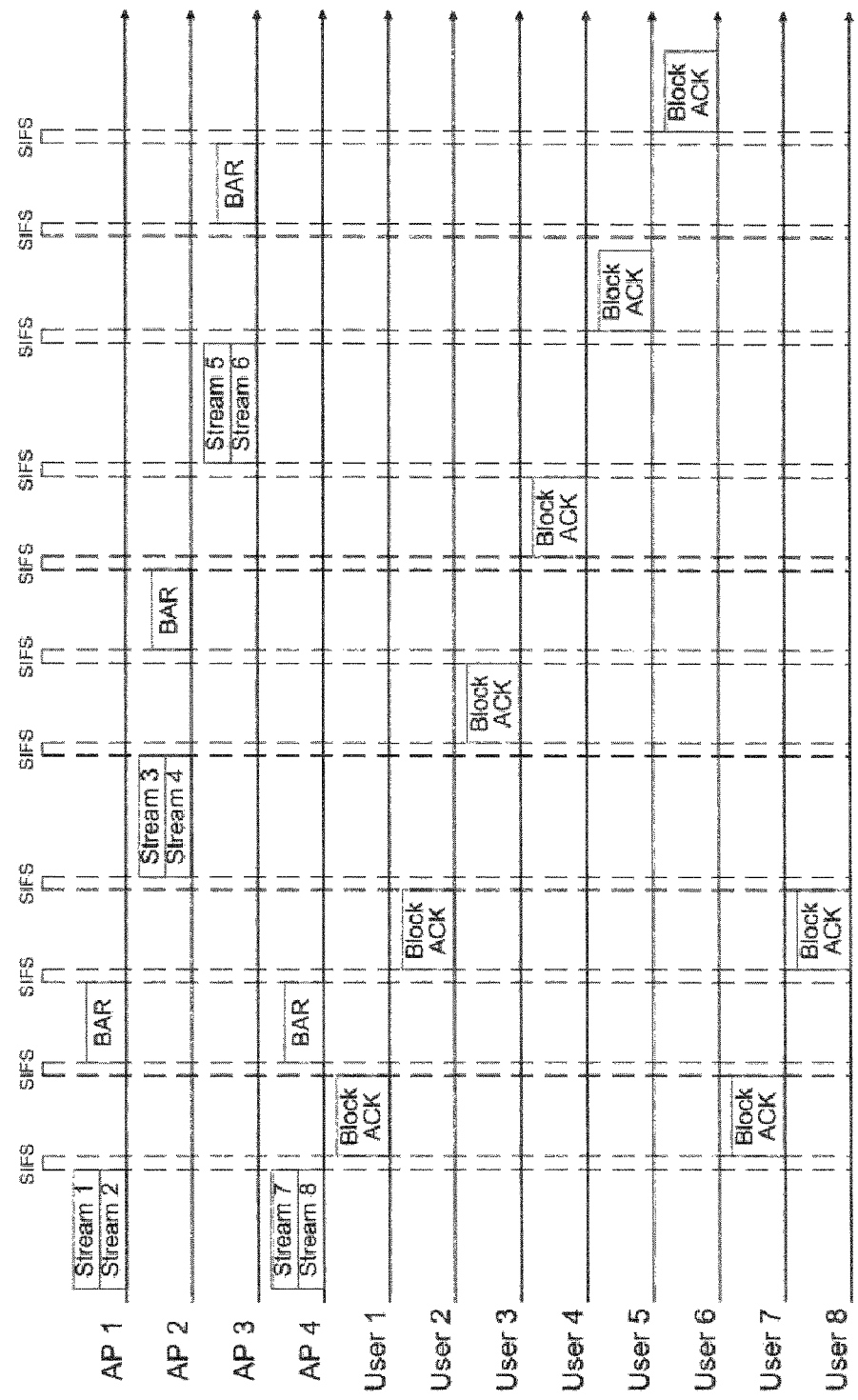

FIGS. 2A and 2B illustrate a probing process packet exchanging timing diagram and a data transmission timing diagram of the present invention of FIG. 1 that employs IEEE 802.11ac multi-user multi-input multi-output technique. In a perfect channel contention (i.e., no collision occurs) and perfect synchronous environment, if it is assumed that the access point AP1 gains a channel use right to execute a probing process, the access point AP4 can also execute the probing process at the same time since the access points AP1 and AP4 will not interfere with each other. According to the procedures regulated by the standard, the access point AP1 and the access point AP4 send null data packet (NDP) announcement and NDP sequentially. After a short inter frame space (IFS) when a first receiving device (that is assumed to be the user device User 1 and the user device User7) receives the NDP, the first receiving device replies measured channel conditions (i.e., the compressed beamforming in FIG. 2A). The access point AP1 and the access point AP4 further send a report poll, and a second receiving device (i.e., that is assumed to be the user device User2 and the user device User8) replies measured channel conditions (i.e., the compressed beamforming).

Since the user devices served by the access point AP2 and the access point AP3, respectively, interfere with each other, the access point AP2 and the access point AP3 have to execute their probing processes separately. Under a case that no collision occurs, the whole probing process has a total of four NDP announcements and NDP packets to complete the probing process, as shown in FIG. 2A. After the execution of a probing process, the four access points transmit data in a channel contending manner. Therefore, it is the best condition that the access point AP1 and the access point AP4 transmit data at the same time. Based on the fact that the access point AP2 and the access point AP3 will interfere with each other, the access point AP2 and the access point AP3 transmit data sequentially (as shown in FIG. 2B).

It is thus known that the IEEE 802.11ac standard, though regulating the MU-MIMO transmission technique, can be applied to an environment in which only one single basic service set is considered. As the deposition of basic service sets becomes dense, a plurality of overlapped basic service sets (OBSS) occur, which result in the channel contention and signal interference among access points. Therefore, IEEE 802.11ac standard cannot solve the problem caused by the overlapping basic service sets effectively.

In compliance with the 802.11ac standard, in order to solve the contention and interference problems of the overlapping basic service sets the present invention provides a cooperative transmission method used for multiple access points in a downlink channel within a wireless local network. In a network in which a plurality of access points exist, if the access points can exchange user channel information and user transmission data through a backhaul network or the Internet network, the network MIMO technical and MU-MIMO downlink transmission technique can be used, such that the contention and interference among basic service sets are reduced.

Theoretically, the application of the network MIMO can deem channels among the cooperative access points and user devices as a single virtual MIMO, such that the system transmission rate is increased. However, the execution of the network MIMO technique needs exchanging transmission data of the user devices among the access points through the backhaul network. If the number of the access points increases, the amount of exchanged information increases accordingly. As a result, the signal processing becomes complex, the transmission delay becomes long, the load of the backhaul network becomes heavy, and the expected system performance cannot be achieved.

To address the issued, the present invention provides a technique concept that uses a console system to manage the access points of the whole system. As shown in FIG. 1, a cooperative transmission system 1 used in multiple access points in a wireless local network includes a plurality of access points 11, a clustering controller 12, and at least one cluster controller 13.

Each of the access points 11 serves at least one user device within a serving range of the access point 11. In an embodiment, the access points 11 include an access point AP1, an access point AP2, an access point AP3 and an access point AP4, and each of the access points 11 serves the user devices within its respective serving range of its respective serving range. As shown, the user devices include user devices User1-User8.

The clustering controller 12 clusters the access points 11 into a plurality of clusters according to the locations of the access points 11 and their serving ranges. As shown, the clustering controller 12 clusters the access points 11 into two clusters, including a cluster 1 (indicated by a dotted line) and a cluster 2 (indicated by a broken line).

The at least one cluster controller 13 controls the cooperative synchronous downlink transmission among all access points within a cluster governed thereby. The cluster controller 13 employs a cooperative multi-antenna multi-user technique to execute synchronous downlink data transmission for multiple user devices within each cluster through the selection of the user devices, execution of a probing process, collection of user channel data and calculation of a pre-coding matrix. Channel information and user transmission data can be exchanged within the same cluster. In an embodiment, the cooperative multi-antenna multi-user technique is, but not limited to a Network MIMO technique.

In an area where clusters intersect, an interference suppression mechanism is employed to exchange user channel information, in order to eliminate the interference generated by the user devices that are located in different cluster intersecting areas or to eliminate the interference generated by the neighboring access points that are located in different clusters. The inter-cluster interference can be eliminated by exchanging user channel information among different clusters. In an embodiment, the interference suppression mechanism uses, but is not limited to a coordination multi-point (CoMP) joint beamforming (JB) technique. Therefore, there is no need to exchange a great amount of user data among different clusters.

According to the cooperative transmission mechanism used for multiple access points in a WiFi wireless network, since the network MIMO and the coordination multi-point joint beamforming techniques are used, it is required to obtain the user channel information between the user devices and the access points. The present invention provides three methods for collecting the user channel information. FIG. 1 illustrates the three methods for collecting the channel state information.

It is assumed that the clustering controller 12 has clustered the four access points AP1-AP4 into two clusters, which are referred to as a cluster 1 and a cluster 2. Each circle with an access point as its center is a range at which the power of the access point can reach. The user devices User1-User4 belong to the cluster 1, and the user devices User5-User8 belong to the cluster 2. It is assumed that each of the access points has two wireless antennas, one of which is used to receive signals, and the other of which is used to transmit signals. Each of the user devices User1-User8 has only one antenna. The access points within the cluster 1 may employ the network MIMO technique, and support the downlink transmission of four user devices (e.g., the user devices User1-User4) at the same time, under an assumption that the inter-cluster interference is avoided. Similarly, the cluster 2 also employs the network MIMO technique, and supports the downlink transmission of four user devices (e.g., the user devices User5-User8).

However, the network MIMO technique, though avoiding the interference among user devices within a single cluster, still suffers from different inter-cluster interferences, e.g., the interference generated by the access point AP3 within the cluster 2 onto the user device User4. Therefore, in order to further avoid the inter-cluster interference the present invention employs a coordination multi-point joint beamforming technique, to exchange the elimination of interference among clusters with the antenna degree of freedom.

In FIG. 1, the cluster 2, in order not to interfere the user device User4, only serves during this transmission three user devices, e.g., the user device User6, the user device User7 and the user device User8, and uses one antenna to suppress the interference onto the user device User4. Before executing the aforementioned downlink cooperative transmission, the cluster controller 13 has to first obtain the channel coefficients between the access points and the user devices, in order to calculate a suitable pre-coding matrix.

In an embodiment, the cooperative transmission system 1 used for multiple access points in a wireless local network determines a single user device within different cluster intersecting areas at one time. The user device User4 is exemplified for the following embodiments.

In order to obtain corresponding channel coefficients, the present invention provides three methods for collecting channel data of access points. Therefore, the access points can execute the collection of channel data, and estimate the wireless channels to the nearby user devices within their service ranges.

According to the first method for collecting the channel data of access points, each of the access points employs a contention channel technique to determine an order in which the channel measuring processes are executed, so as to obtain the user channel state information. In other words, each of the access points employs the contention channel technique to determine the order in which the channel measuring processes are executed. The first method differs from the conventional method of FIG. 2A in that each of the access points in the first method needs to obtain the channels between the access point itself and all selected users within the cluster, and adjacent affected users that are located in the periphery of the cluster.

As the cluster 1 is concerned, as shown in FIG. 1, the access point AP1 will collect the channel state information of the user device User1, the user device User2 and the user device User3. However, the access point AP1 will not collect the channel information of the user device User4, since the user device User4 is located outside the transmission power range of the access point AP1. Similarly, the access points AP2 will collect the channel state information of the user device User1, the user device User2, the user device User3 and the user device User4. As the cluster 2 is concerned, the access points AP3 will collect the channel state information of the user device User4, the user device User6 and the user device User7. Please be noted that the user device User4 is a user device within the cluster 1, and the access point AP4 will collect the channel state information of the user device User6, the user device User7 and the user device User8. Under a circumstance that the channel contention is perfect, it is assumed that the access point AP1 obtains the channel access right to execute a probing process, the access point AP4 can also execute the probing process at the same time, since the access point AP4 does not interfere with the access point AP1.

The access point AP1 and the access point AP4 collect channel state information in accordance with the channel probing process regulated by the IEEE 802.11ac standard. In the end of the collection, the access point AP2 and the access point AP3 start to contend channels. It is assumed that the access point AP2 obtains the channel priority first and executes its channel probing process,. Since the access point AP 3 will be interfered by the replies to the user device by the access point AP2, the access point AP3 cannot execute its probing process unless the probing process of the access point AP2 is completed.

Figure 3:
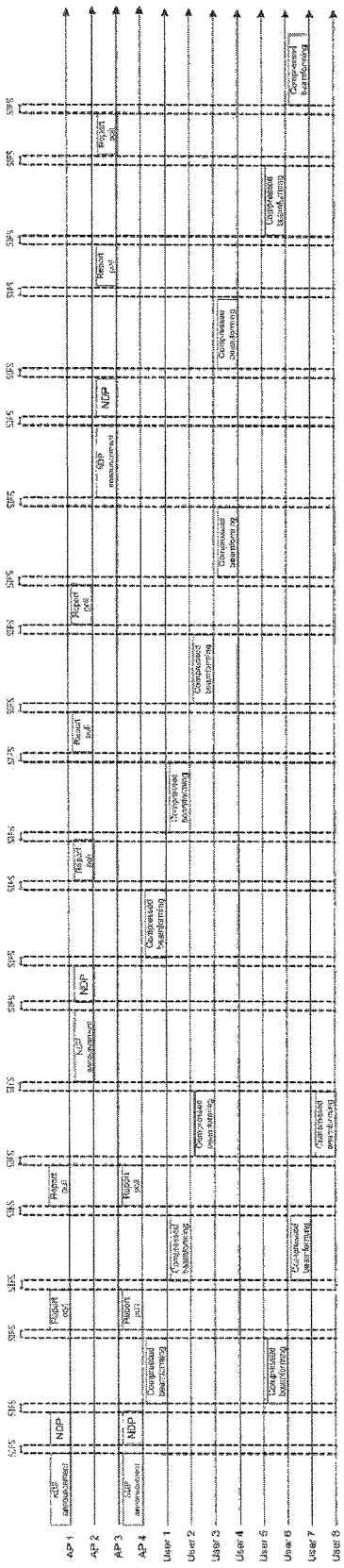
FIG. 3 shows a packet exchanging timing diagram of an interference suppression mechanism that employs a multi-user multi-input multi-output technique and a first probing process in FIG. 1 according to the present invention.

In a case that no collision occurs, the whole probing process is shown in FIG. 3. In the method, a total of four NDPs announcements and NDP packets are sent, in order to collect the needed channel state information. Since the four access points obtain the channel access right and send the NDP announcements and the NDPs according to the channel contention mechanism regulated by the IEEE 802.11ac standard, the fields of the packets are regulated in accordance with the IEEE 802.11ac standard, without the need to be amended.

In the second method for collecting the channel state information, the clusters execute a probing process sequentially, and user devices located in different cluster intersecting areas participate in the probing process of a plurality of clusters, so as to obtain the user channel information. With a cluster as a unit, the clusters execute a probing process sequentially, and user devices that are located in different cluster intersecting areas will participate in the probing process of a plurality of clusters.

Figure 4:
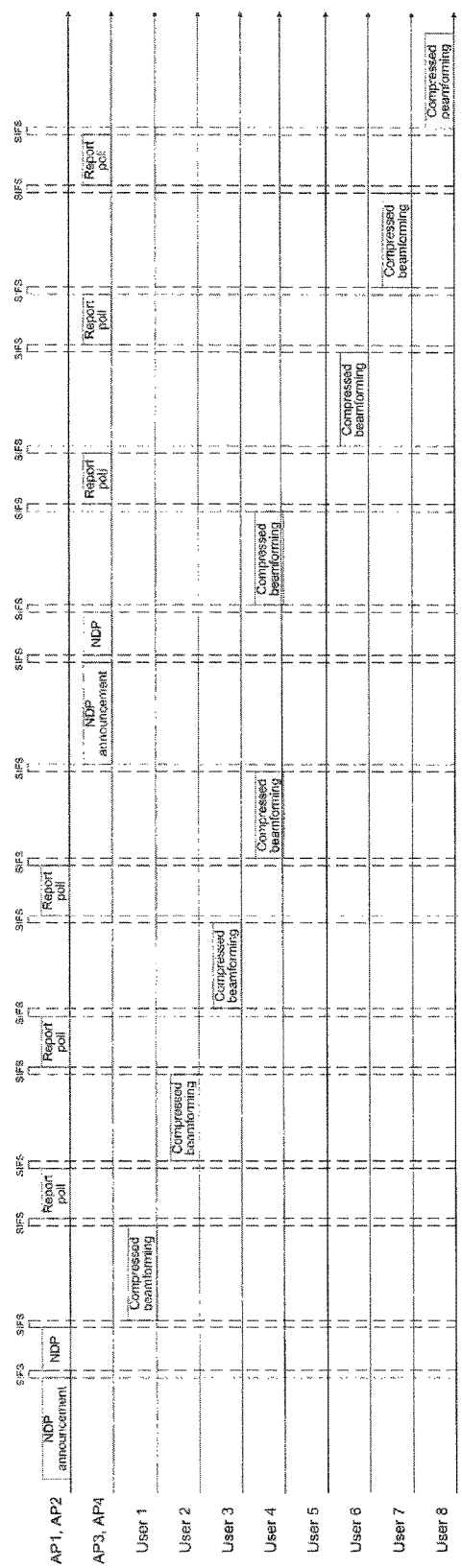
FIG. 4 shows a packet exchanging timing diagram of an interference suppression mechanism that employs a multi-user multi-input multi-output technique and a second probing process in FIG. 1 according to the present invention.

As refer to FIG. 1. The clustering controller 12 sets multicast addresses for the cluster 1 and the cluster 2. The access point AP1 and the access point AP2 of the cluster 1 send the NDP announcements and the NDP packets at the same time, and collect the channel information of the user devices User1-User4. Then, the access point AP3 and the access point AP4 of the cluster 2 send the NDP announcements and the NDP packets, and collect the chancel information of the user devices User4 and User6-User8. The second method sends two NDP announcements and NDP packets, so as to collect the channel information that is needed. The whole probing process is shown in FIG. 4.

Figure 5:
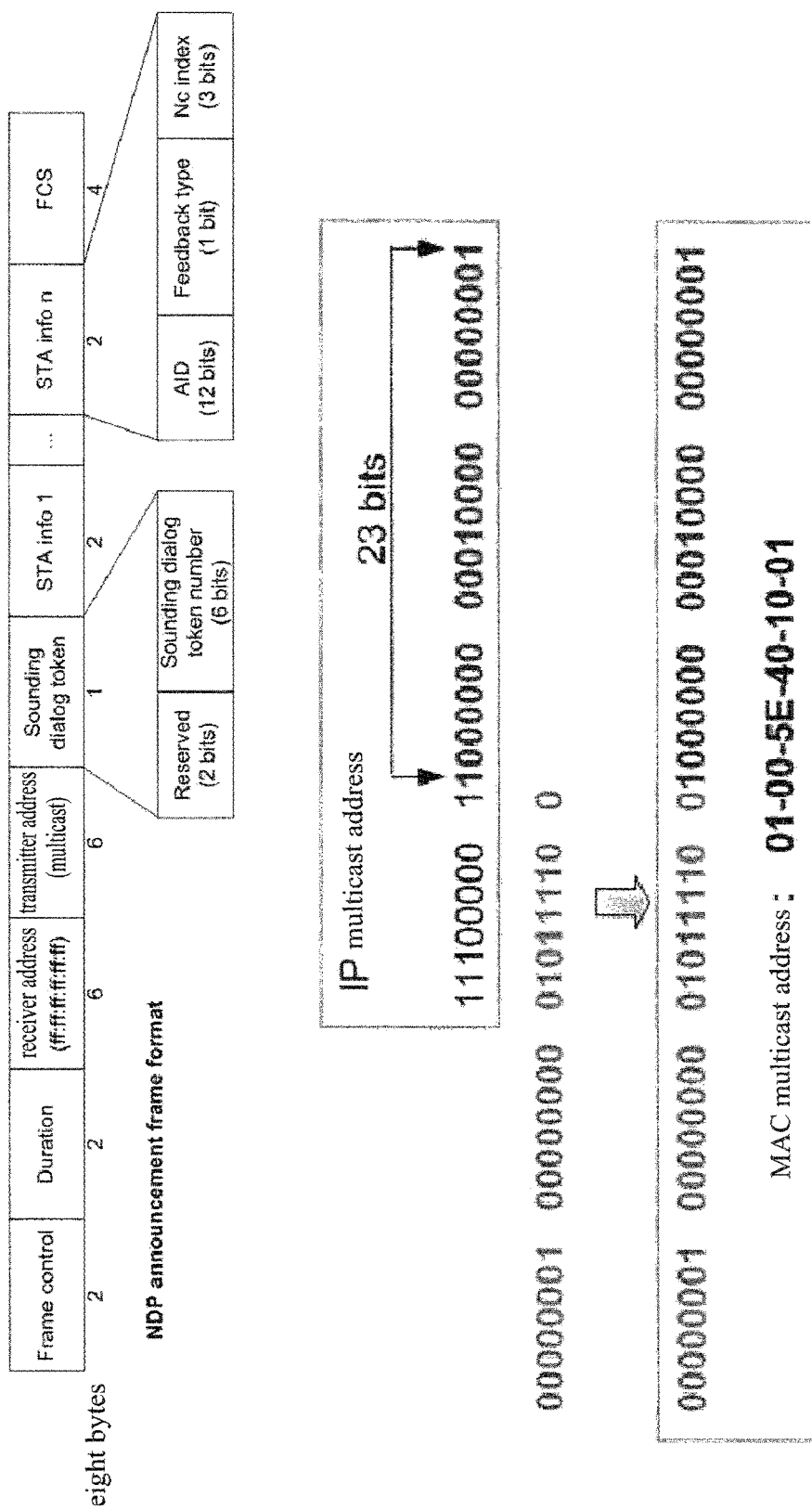
FIG. 5 illustrates a packet format and MAC address settings at a transmission end in a second probing process according to the present invention.

The packet format of the NDP announcements of the IEEE 802.11ac standard is shown in the upper half of FIG. 5. When the packet is loaded, since supporting the multi-user multi-input multi-output technique, the receiver MAC address of six bytes is a broadcast address (i.e., ff:ff:ff:ff:ff:ff), and the transmitter MAC address of the six bytes can be obtained through converting the multicast IP address into the multicast MAC address.

The conversion method is shown in the lower half of FIG.5, including placing the least significant 23 bits of the multicast IP address to the least significant 23 bits of the multicast MAC address, fixing the most significant 24 bits of the multicast MAC address to be 0x01005E, and assigning the twenty-fifth bit to be 0. For example, the MAC multicast address of the IP multicast address 224.192.16.1 is 01-00-5E-40-10-01.

In the third method for collecting channel state information, a multicast group is formed by access points of a plurality of clusters, such that each of the user devices can estimate and reply all user channel information at one time. Since the IEEE 802.11ac standard can support the pre-coding matrix calculation of at most eight antennas, the third method for collecting channel data can only be applied to a multicast group in which all access points has a total number of antennas that does not exceed eight, and the user device can thus estimate and reply all channel information at one time.

Figure 6:
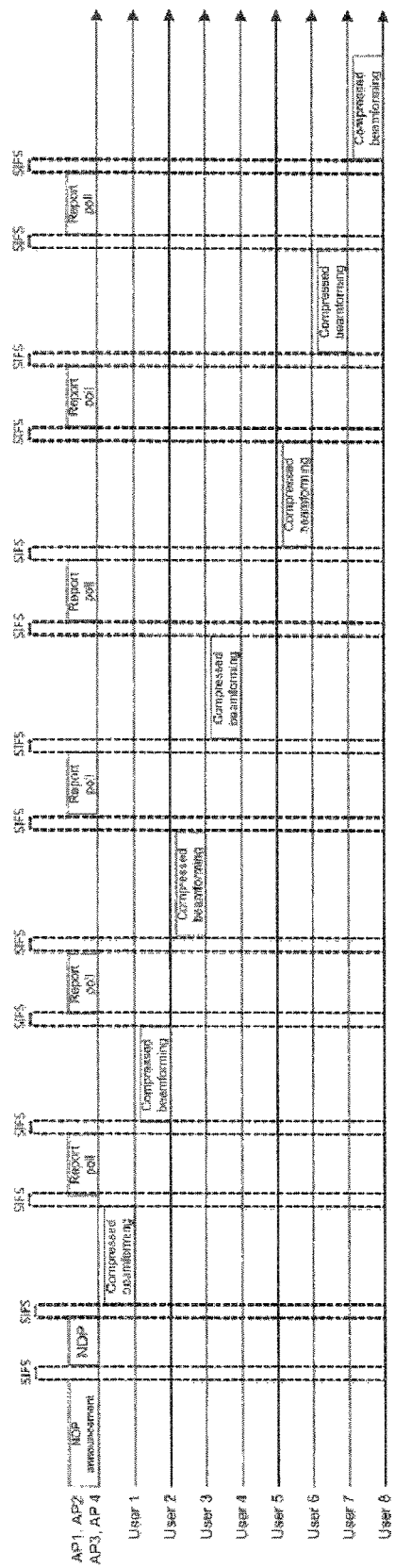
FIG. 6 shows a packet exchanging timing diagram of an interference suppression mechanism that employs a multi-user multi-input multi-output technique and a second probing process in FIG. 1 according to the present invention.

Also referring to FIG. 1, since the four access points have a total of eight antennas, each of the user devices, when receiving a report poll, can send the estimated channel state information to the access points group at one time. Compared with the first and second methods, the third method can receive the needed channel state information by sending the NDP announcements and the NDP packets one time. The whole probing process is shown in FIG. 6. The conversion method of the IP multicast address and the MAC multicast address is the same as that described for the second method.

Referring to FIG. 6, the NDP signals in the method can be simplified by using the geographic relation among the access points and the power ranges of the access points. FIG. 1 is taken as an example. This NDP signal is constituted by four unit orthonormal vectors, denoted by $\nabla_1$, $\nabla_2$, $\nabla_3$ and $\nabla_4$, respectively. The access point AP1 can use antennas to send $\nabla_1$ and $\nabla_2$ vectors, respectively, and the access point AP2 can use antennas to send $\nabla_3$ and $\nabla_4$ vectors, respectively, to be NDP signals. Since having a transmission power range not overlapped with the transmission range of the access point AP1, the access point AP3 can adopt $\nabla_1$ and $\nabla_2$ to be the NDP signals repetitively. Based on the same reasons, the access points AP4 can adopt $\nabla_3$ and $\nabla_4$. Therefore, each of the user devices can estimate the wireless channels form all the neighboring access points whose transmission power can reach itself. For example, the user device User4 can hear the NDP signals sent from the access point AP2 and the access point AP3, and estimate corresponding channel coefficients. In mathematics, a symbol $\hat{h}_{j,k}^{(i)}$ is used to represent the channel coefficients of the $i^{th}$ antenna of the access point APj estimated by the user device Userk to itself. For example, the user device User4 can estimate channel coefficients, such as $\hat{h}_{2,4}^{(1)}$, $\hat{h}_{2,4}^{(2)}$, $\hat{h}_{3,4}^{(1)}$ and $\hat{h}_{3,4}^{(2)}$.

When the transmission of NDP is completed, the user device User1 will report the estimated channel state information in accordance with the IEEE 802.11ac standard. Then, the access points in the network will investigate the channel state information of the remaining user devices sequentially. For example, the access point AP1 will inquire the user device User2 and the user device User3, the access point AP2 will inquire the user device User4, the access point AP3 will inquire the user device User6 and the user device User7, and the access point AP4 will inquire the user device User8.

When reporting information, the user device User4 sends the four estimated channel coefficients to the access point AP2 in the cluster 1. Meanwhile, in order to obtain the channel state information of the user device User4, the cluster 2 may use the access point AP3 to overhear the channel coefficient report of the user device User4, or obtain its channel state information through the backhaul network or the Internet network from the access point AP2 of the cluster 1.

Through the three different methods for collecting channel state information of access points, the collection of channel data can be completed. After the access points complete the channel probing process, the access points will report the collected channel state information to the cluster controller in its cluster. Then, the cluster controller exchanges channel state information for the scheduled user devices located in the overlapped area of the clusters through the clustering controller, or the backhaul network or Internet network among the clusters.

When the cluster controller in each of the clusters receive the channel information reported from its neighboring clusters sequentially, a virtual multi-input multi-output channel coefficient matrix can thus be formed. By using this matrix, corresponding pre-coding can be calculated by a zero-forcing pre-coder method, for example.

Take the cluster 2 as an example, where the cluster controller forms, in accordance with the received channel state information, a virtual multi-input multi-output channel matrix H as follows:

$$H = \begin{bmatrix} \hat{h}_{3,4}^{(1)} & \hat{h}_{3,6}^{(1)} & \hat{h}_{3,7}^{(1)} & 0 \\ \hat{h}_{3,4}^{(2)} & \hat{h}_{3,6}^{(2)} & \hat{h}_{3,7}^{(2)} & 0 \\ 0 & \hat{h}_{4,6}^{(1)} & \hat{h}_{4,7}^{(1)} & \hat{h}_{4,8}^{(1)} \\ 0 & \hat{h}_{4,6}^{(2)} & \hat{h}_{4,7}^{(2)} & \hat{h}_{4,8}^{(2)} \end{bmatrix}$$

, where the columns represent different user devices, and the rows represent antennas from the user devices to some access point. The user device User4 is located outside the transmission range of the access point AP4. Therefore, it is assumed that $\hat{h}_{4,4}^{(1)}=0$ and $\hat{h}_{4,4}^{(2)}=0$. Similarly, it is assumed that $\hat{h}_{3,8}^{(1)}=0$ and $\hat{h}_{3,8}^{(2)}=0$. Although the user device 4 is not a user device of the cluster 2, the user device 4 is still taken into consideration, in order to avoid the inter-cluster interference. Therefore, its interference can be avoided or suppressed in downlink transmission.

The user devices 4 and 6-8 will receive from the access points signals as follows.

$$Y = [y_4 y_6 y_7 y_8] = XH + n$$
$$= [x_1 x_2 x_3 x_4]H + n$$
$$= [d_1 d_2 d_3 d_4]GH + n$$
$$= [d_1 d_2 d_3 d_4](H^*xH)^{-1}H^*xH + n$$
$$= [d_1 d_2 d_3 d_4] + (n_4 n_6 n_7 n_8)$$
$$= [0 d_2 d_3 d_4] + (n_4 n_6 n_7 n_8)$$

, wherein $d_1$, $d_2$, $d_3$ and $d_4$ represent the data to be sent to the user devices User4 and User6-User8, respectively. Since the cluster 2 does not send data to the user device 4, the value of $d_1$ here is set as zero. Further, using the channel coefficient matrix H, the cluster controller of the cluster 2 can adopt the zero-forcing pre-coder method to calculate its pre-coding matrix as $G=(H^*xH)^{-1}H^*$, where * represents a conjugate transpose operation symbol. The pre-coding matrix G is represented as $[\bar{g}_1, \bar{g}_2, \bar{g}_3, \bar{g}_4]^T$, where $\bar{g}_2$, $\bar{g}_3$ and $\bar{g}_4$ represent the pre-coding vectors of the user devices User6-User8, respectively. Using this result, the multi-input multi-output system pre-loads these three pre-coding vectors before transmission, and can be avoided from interfering the user device User4 when downlink transmission is performed on the user devices User6-User8.

After the channel information is obtained, the synchronous downlink data transmission, i.e., data stream transmission, of the users in each of the clusters can be performed either with or without a request-to-send and clear-to-send (RTS/CTS) mechanism.

Figure 7:
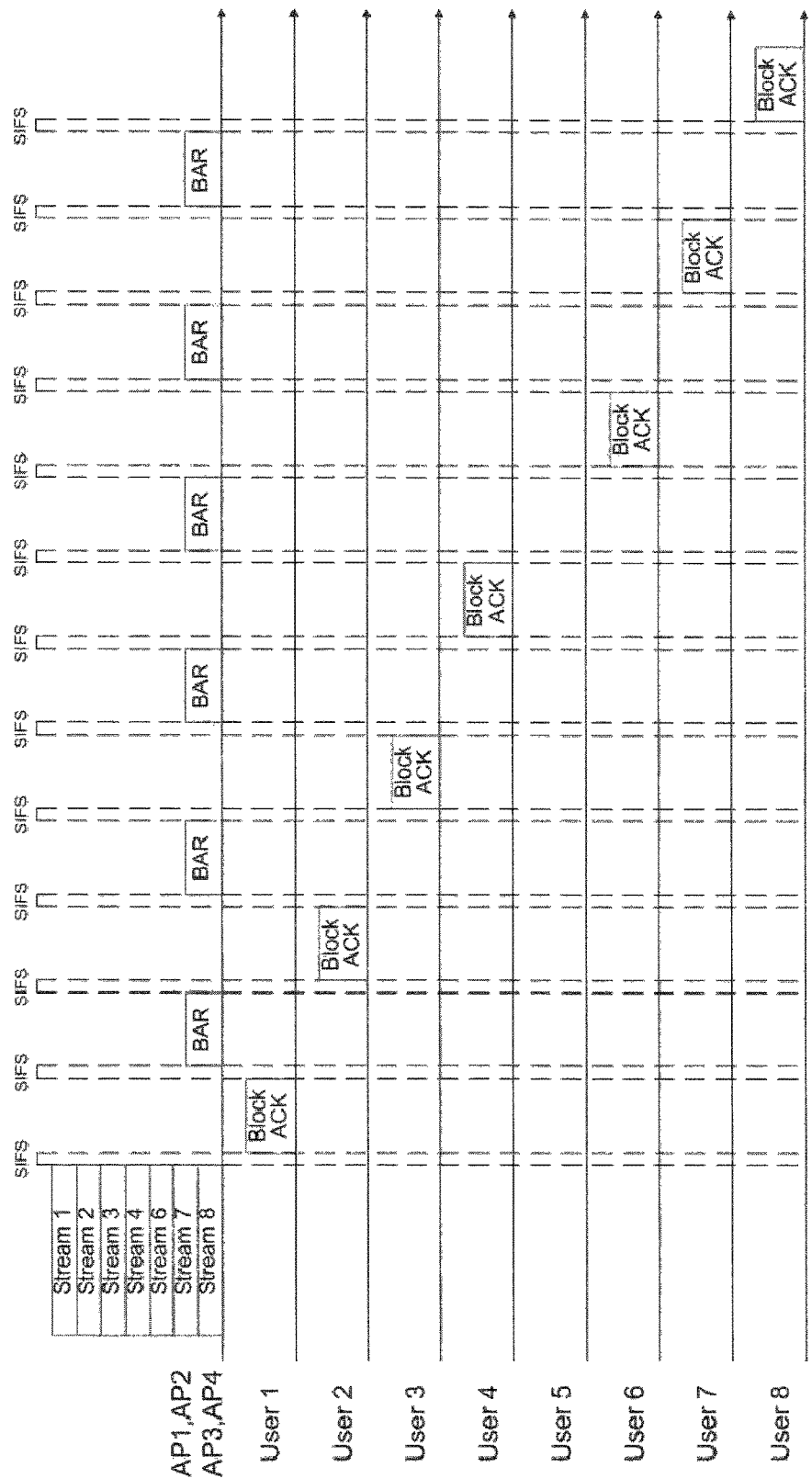
FIG. 7 is a data transmission timing diagram of a cooperative transmission system used in multiple APs without a RTS/CTS mechanism in a wireless local network.

If the RTS/CTS mechanism is not used, this differs from the multi-user device multi-input multi-output technique of the IEEE 802.11ac standard in that the mechanism of the present invention includes two clusters, four access points, and seven data streams can be transmitted at the same frequency, the data transmission timing diagram of which is shown in FIG. 7.

Figure 8:
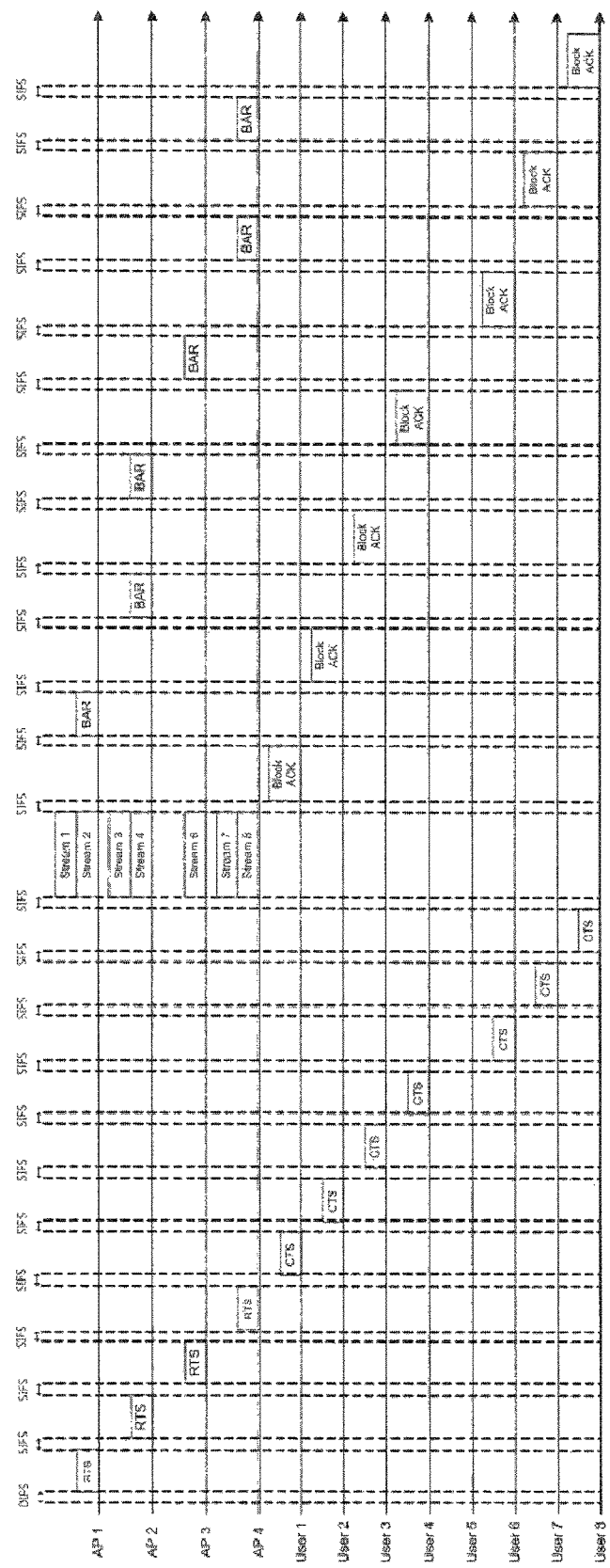
FIG. 8 is a data transmission timing diagram of a cooperative transmission system used in multiple APs in a wireless local network that employs a first RTS/CTS mechanism.
Figure 9:
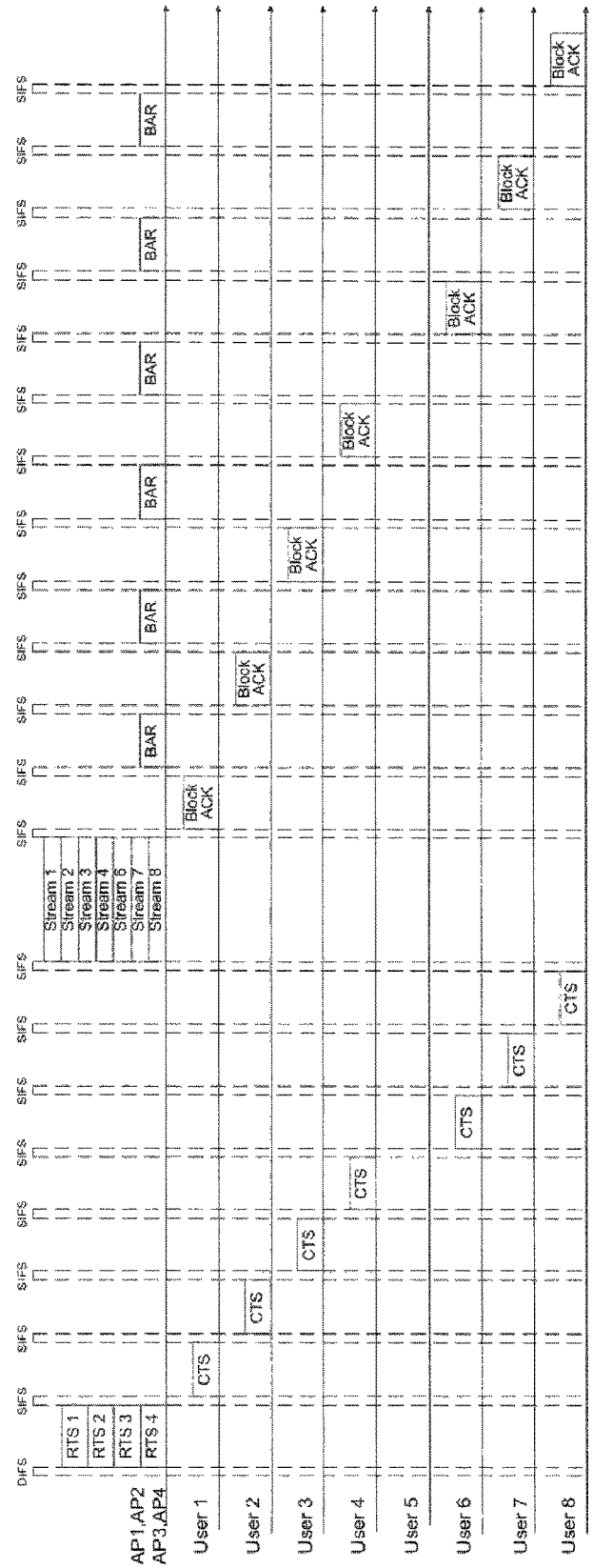
FIG. 9 is a data transmission timing diagram of a cooperative transmission system used in multiple APs in a wireless local network that employs a second RTS/CTS mechanism.

On the contrary, if the access point, when executing the downlink data transmission, has to execute the RTS/CTS mechanism, there are two transmission ways for RTS and CTS control packets, as shown in FIGS. 8 and 9, respectively. FIG. 8 shows four access points transmitting RTS sequentially, each of the user devices replying CTS sequentially, the pre-coding matrix obtained through calculation, the four access points transmitting data streams simultaneously, and each of the user devices replying acknowledge packets (ACKs).

FIG. 9 shows that, under a condition that the pre-coding matrix is known, four access points calculate the RTS packets and the pre-coding matrix, transmit the RTS packets simultaneously, and achieve the interference inhibition effect. Since the present invention belongs to downlink multi-point coordination transmission, the user devices reply the CTS packets sequentially.

Figure 10:
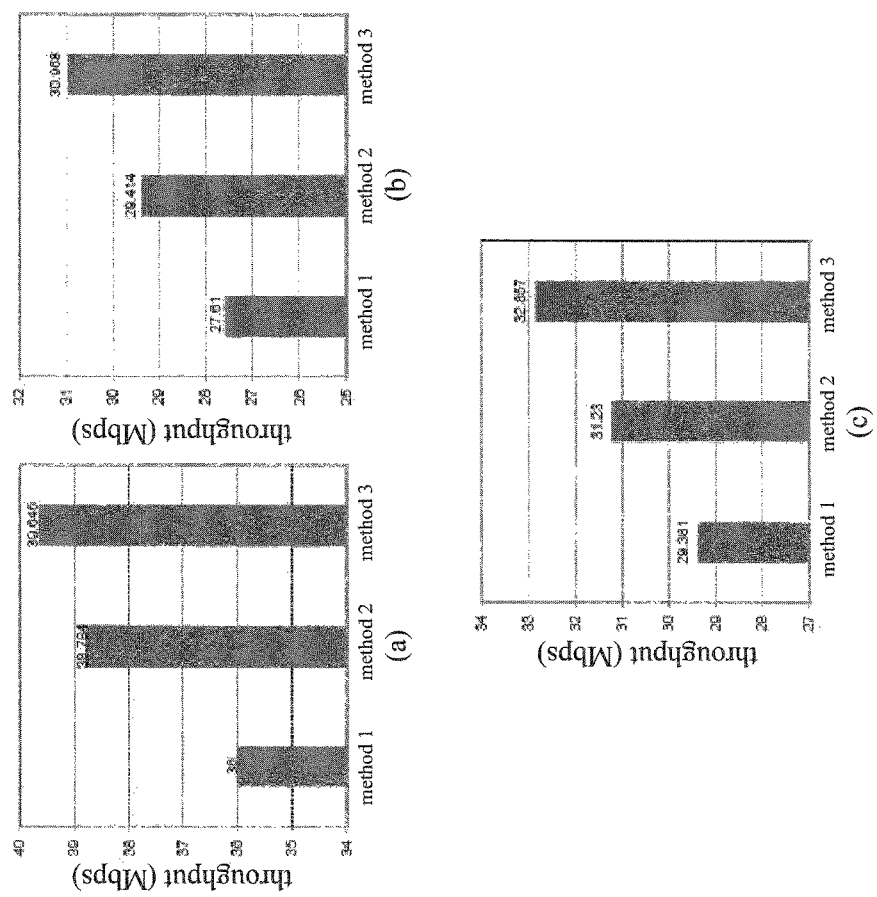
FIG. 10 is a comparison diagram of network throughput efficiency with and without a RTS/CTS mechanism according to the present invention.

Taking the network topology of FIG. 1 as an example, the performances of the three probing processes are evaluated by conducting simulation. FIGS. 10(a), (b) and (c) show the network throughputs for the scenarios of with and without RTS/CTS and RTS/CTS mechanisms, respectively. As shown, the third probing process utilizes the least channel time, and thus has a greatest network throughput. On the contrary, the first probing process consumes the most channel time, and thus has a network throughput that is about 90% of that of the third probing process.

Similarly, the first RTS packet exchanging mechanism occupies more channel time, and the second RTS/CTS packet exchanging mechanism has a network throughput greater than that of the first RTS/CTS packet exchanging mechanism by 6%, when the first and second RTS/CTS packet exchanging mechanisms use the same probing process. For each probing process, two different RTS/CTS packet exchanging mechanisms generate a 6% network throughput difference.

Figure 11:
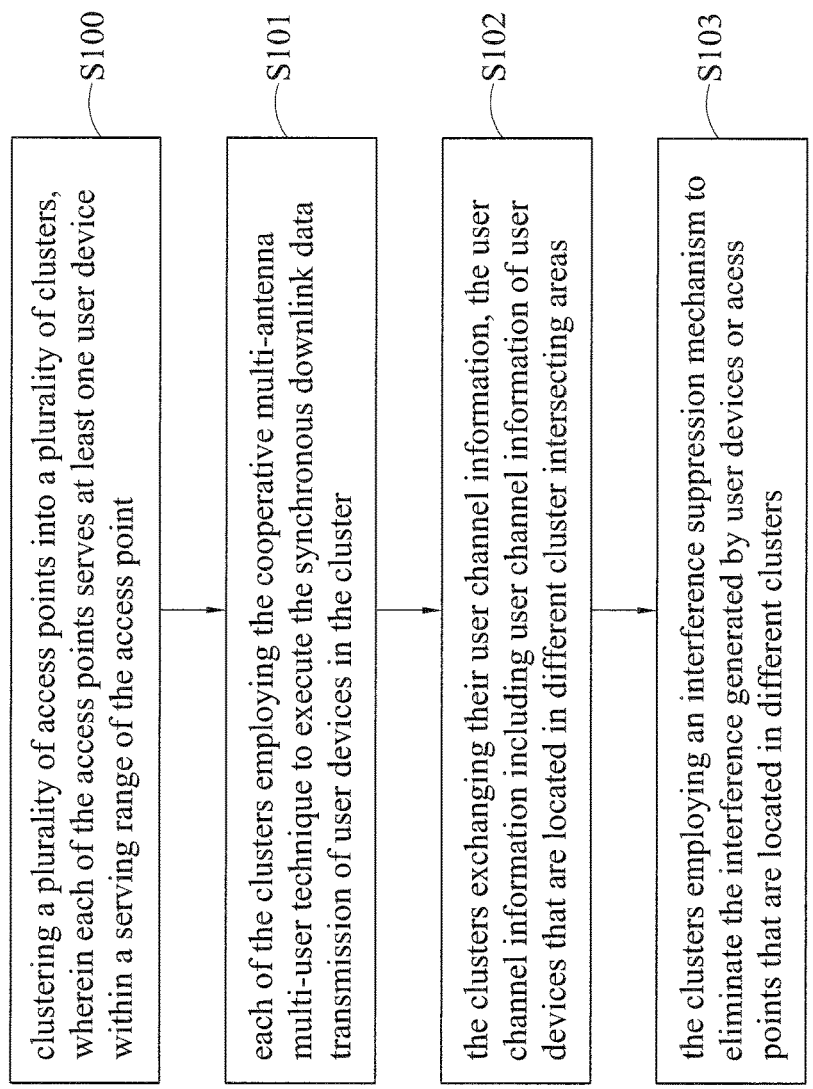
FIG. 11 is a flow chart of a cooperative transmission method used in multiple APs in a wireless local network according to the present invention.

Refer to FIG. 11, which is a flow chart of a cooperative transmission method used for multiple access points in a wireless local network according to the present invention. In step S100, a plurality of access points are clustered into a plurality of clusters, wherein each of the access points serves at least one user device within a serving range of the access point. In an embodiment, the access points are clustered according to the locations of the access points and the serving range. Each of the access points has its own user device to be served thereby.

In step S101, each of the clusters employs the cooperative multi-antenna multi-user technique to execute the synchronous downlink data transmission of user devices in the cluster. In step S101, each of the clusters employs the cooperative multi-antenna multi-user technique, which is, but not limited to a network MIMO technique. Through the selection of user devices, execution of a probing process, collection of the channel information and calculation of a pre-coding matrix in each of the clusters, the synchronous downlink data transmission for the user devices in each of the clusters can be achieved.

In step S102, the clusters exchange their user channel information. In an embodiment, the user channel information includes the user channel information of the user devices that are located in different cluster intersecting areas. Before the abovementioned downlink cooperative transmission is executed, the cluster controller 13 has to obtain the channel coefficients between the access points to the user devices, such that a suitable pre-coding matrix can be calculated. In order to obtain the corresponding channel coefficients, in step S102 the collection of channel data of access points is executed.

The present invention also provides three method for collecting channel data of access points, including: a first method in which the access points employ a contention channel technique to determine an order in which the channel measuring processes are executed, so as to obtain the user channel information; a second method in which the clusters execute a probing process sequentially, and user devices located in different cluster intersecting areas participate in a probing process of a plurality of clusters, to obtain the user channel information; and a third method in which the access points in a plurality of clusters form a multicast group, such that each of the user devices can estimate and reply all channel information at one time, so as to obtain the user channel information.

In step S103, the clusters employ an interference suppression mechanism to eliminate the interference generated by user devices or neighboring access points that are located in different clusters. In step S103, the interference among clusters can be eliminated by exchanging their user channel information. In an embodiment, the interference suppression mechanism is, but not limited to coordinated multi-point (CoMP) joint beamforming technique (JB) technique.

The present invention also provides that the synchronous downlink data transmissions of user devices in each of the clusters with or without a RTS/CTS mechanism. The technical resolutions relating the above steps have been disclosed in detailed in the previous paragraphs, further description hereby omitted.

According to a cooperative transmission system and a cooperative transmission method used for multiple access points in a wireless local network, a clustering controller clusters a plurality of access points governed thereby into a plurality of clusters, each of which has its own cluster controller; and the access points in each of the clusters employ a cooperative multi-antenna multi-user technique to exchange the channel information and user transmission data, to form a virtual multi-user multi-input multi-output downlink transmission system. For the inter-cluster interference, the exchanges of channel information can inhibit the possible interference among the user devices within different cluster intersecting areas. Therefore, the cooperative downlink transmission mechanism provided by the present invention provides cooperative transmission among a plurality of access points in a WiFi wireless local network, especially provided for overlapped basic service sets. Accordingly, the spectrum resource contention and signal interference among access points in overlapped basic service sets can be solved effectively.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A cooperative transmission system used in multiple access points in a wireless local network, comprising:
    a plurality of access points, each of which being configured to serve at least one user device within a serving range of the access point;
    a clustering controller configured to cluster the access points into a plurality of clusters according to locations of the access points and the serving range; and
    at least one cluster controller configured to control cooperative synchronous downlink transmissions among all of the access points in a cluster governed by the at least one cluster controller, wherein the at least one cluster controller employs a cooperative multi-antenna multi-user technique to execute synchronous downlink data transmissions of the user devices in the clusters through selection of the user devices, execution of a probing process, collection of user channel information and calculation of a pre-coding matrix, wherein at least two of the clusters, when intersecting with each other, collect the user channel information for employing an interference suppression mechanism, so as to eliminate interference generated by the user devices that are located in different cluster intersecting areas.

2. The cooperative transmission system of claim 1, wherein each of the access points determines an order of executing a channel measuring process by using a channel contention technique, so as to obtain the user channel information.

3. The cooperative transmission system of claim 1, wherein the clusters execute the probing process sequentially, and the user devices located in the different cluster intersecting areas participate in the probing process of the clusters, so as to obtain the user channel information.

4. The cooperative transmission system of claim 1, wherein the access points within the same cluster form a multicast group, such that each of the user devices performs channel estimation in one time and replies all channel information, so as to obtain the user channel information.

5. The cooperative transmission system of claim 1, wherein the interference suppression mechanism is a joint beamforming technique in a coordinated multi-point process.

6. A cooperative transmission method used in multiple access points in a wireless local network, comprising:

clustering a plurality of access points into a plurality of clusters, wherein each of the access points serves at least one user device within a serving range of the access point;

each of the clusters executing synchronous downlink data transmissions of the user devices in each of the clusters through a cooperative multi-antenna multi-user technique;

having the clusters collect user channel information thereof with each other, the user channel information including those of the user devices that are located in different cluster intersecting areas, wherein each of the access points determines an order of executing a channel measuring process by using a channel contention technique, so as to obtain the user channel information; and having the clusters eliminate interference generated by the user devices or the neighboring access points that are located in the different clusters through an interference suppression mechanism.

7. The cooperative transmission method of claim 6, wherein the clusters execute a probing process sequentially, and the user devices located in the different cluster intersecting area participate in the probing process of the clusters, so as to obtain the user channel information.

8. The cooperative transmission method of claim 6, wherein the access points within the cluster form a multicast group, such that each of the user devices estimates in one time and replies all channel information, so as to obtain the user channel information.

9. The cooperative transmission method of claim 6, wherein the interference suppression mechanism is a joint beamforming technique in a coordinated multi-point process.

10. A cooperative transmission system used in multiple access points in a wireless local network, comprising:

a plurality of access points, each of which is configured to serve at least one user device within a serving range of the access point;

a clustering controller configured to cluster the access points into a plurality of clusters according to locations of the access points and the serving range; and at least one cluster controller configured to control cooperative synchronous downlink transmissions among all access points in a cluster governed by the at least one cluster controller, wherein the at least one cluster controller employs a cooperative multi-antenna multi-user technique to execute synchronous downlink data transmissions of the user devices in the clusters through selection of the user devices, execution of a probing process, collection of user channel information and calculation of a pre-coding matrix, wherein at least two of the clusters, when intersecting with each other, collect the user channel information for employing an interference suppression mechanism, so as to eliminate interference generated by neighboring access points that are located in different clusters.

* * * * *